(12) United States Patent
Jang et al.

(10) Patent No.: US 11,901,798 B2
(45) Date of Patent: Feb. 13, 2024

(54) FAN MOTOR

(71) Applicant: NEW MOTECH CO., LTD., Gwangju (KR)

(72) Inventors: Jeong Cheol Jang, Gwangju (KR); Gyeong Su Park, Gwangju (KR); Woo Sung Cho, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 274 days.

(21) Appl. No.: 17/288,501

(22) PCT Filed: Oct. 23, 2019

(86) PCT No.: PCT/KR2019/013941
§ 371 (c)(1),
(2) Date: Apr. 23, 2021

(87) PCT Pub. No.: WO2020/138678
PCT Pub. Date: Jul. 2, 2020

(65) Prior Publication Data
US 2021/0391768 A1    Dec. 16, 2021

(30) Foreign Application Priority Data

Dec. 24, 2018  (KR) .................. 10-2018-0168123

(51) Int. Cl.
*H02K 7/14*     (2006.01)
*F04D 17/16*    (2006.01)
(Continued)

(52) U.S. Cl.
CPC ............... *H02K 7/14* (2013.01); *F04D 17/16* (2013.01); *F04D 25/0693* (2013.01);
(Continued)

(58) Field of Classification Search
CPC ...... H02K 7/14; H02K 5/161; H02K 2203/03; H02K 2211/03; F04D 29/056; F04D 25/0693
(Continued)

(56) References Cited

U.S. PATENT DOCUMENTS

2007/0205676 A1   9/2007   Lan et al.
2015/0076934 A1   3/2015   Jang et al.

FOREIGN PATENT DOCUMENTS

EP    0263890    *   4/1988   ............. H02K 29/08
JP    S6310760   *   1/1988   ............... H02K 7/14
(Continued)

OTHER PUBLICATIONS

Machine translation of WO2014106893; Jang et al.; Jul. 2014 (Year: 2014).*

(Continued)

*Primary Examiner* — Terrance L Kenerly
(74) *Attorney, Agent, or Firm* — Revolution IP, PLLC

(57) ABSTRACT

The fan motor according to the present invention comprises a fan (10) comprising a fan body (11) having a circular plate shape, a plurality of fan blades (12) formed in an upper portion of the fan body (11), a central protruding part (13) protruding upwardly from a central portion of the fan body (11), a shaft fixing part (14) formed in an inner side of the central protruding part (13), a shaft (15) coupled and fixed to the shaft fixing part (14) to rotate when the fan body (11) rotates, and a magnet receiving part (16) formed in a central lower portion of the fan body (11); a ring plate magnet (20) coupled to the magnet receiving part (16); a motor bracket (30) having a PCB bracket coupling part (31) formed in a
(Continued)

center; a PCB bracket (40) comprising a body (41) having a cup shape, a bearing insertion part (42) having a cylinder shape, protruding upwardly from a center of the body (41), a through-hole (44) formed inside the bearing insertion part (42), into which a bearing (45) is inserted, and the bearing (45) inserted and fixed to the through-hole (44); and a coil-PCB assembly (50) comprising a coil cover (51), a pair of D-type coils (52) installed in the coil cover (51), and a PCB (53) located in a lower portion of the coil cover (51) and installed in the body (41), wherein the ring plate magnet (20) installed in a lower portion of the fan body (11) is located in an upper portion of the pair of D-type coils (52) to face therewith.

5 Claims, 5 Drawing Sheets

(51) Int. Cl.
*F04D 25/06* (2006.01)
*F04D 29/056* (2006.01)
*H02K 5/16* (2006.01)
*H02K 7/00* (2006.01)
*H02K 1/2795* (2022.01)

(52) U.S. Cl.
CPC ......... *F04D 29/056* (2013.01); *H02K 1/2795* (2022.01); *H02K 5/161* (2013.01); *H02K 7/003* (2013.01); *H02K 2203/03* (2013.01); *H02K 2211/03* (2013.01)

(58) Field of Classification Search
USPC .......................................... 310/89, 90, 49.22
See application file for complete search history.

(56) References Cited

FOREIGN PATENT DOCUMENTS

| | | | |
|---|---|---|---|
| JP | 2015-056931 A | | 3/2015 |
| KR | 20-1990-0007271 Y1 | | 8/1990 |
| KR | 10-2010-0039163 A | | 4/2010 |
| KR | 10-2015-0031358 A | | 3/2015 |
| KR | 10-2016-0059313 A | | 5/2016 |
| KR | 10-2018-0010552 A | | 1/2018 |
| KR | 10-2018-0013244 A | | 2/2018 |
| WO | WO2014106983 | * | 7/2014 ......... F04D 25/0646 |

OTHER PUBLICATIONS

International Search Report for PCT/KR2019/013941 dated Jan. 29, 2020 from Korean Intellectual Property Office.

* cited by examiner

[Fig. 1]
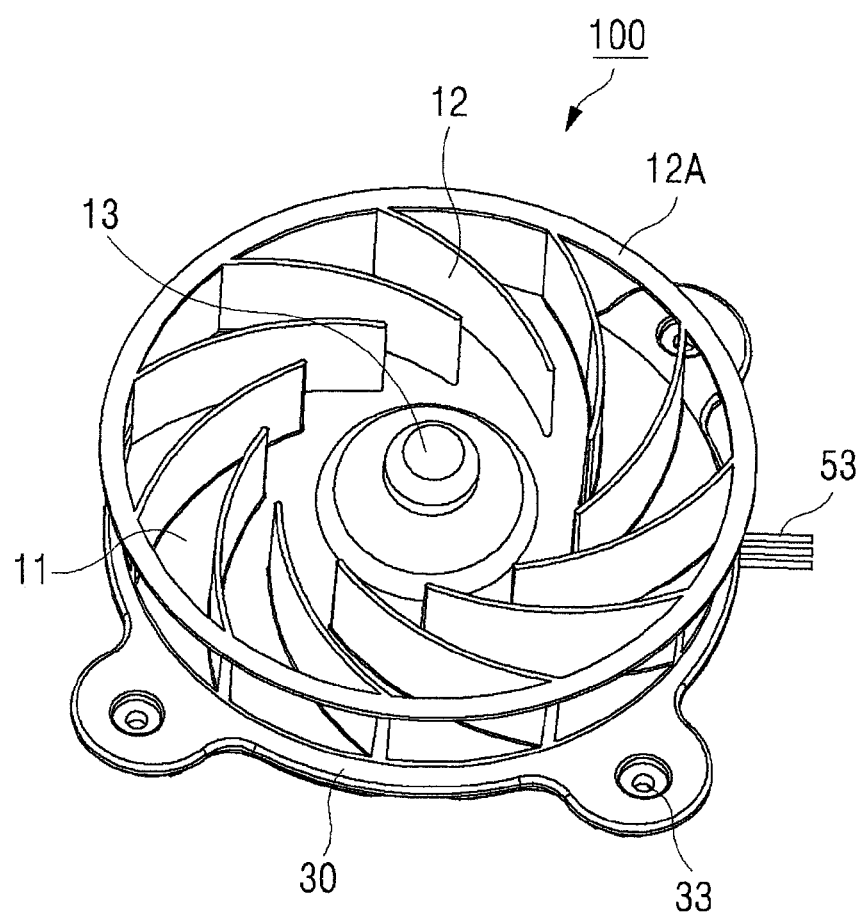

[Fig. 2]
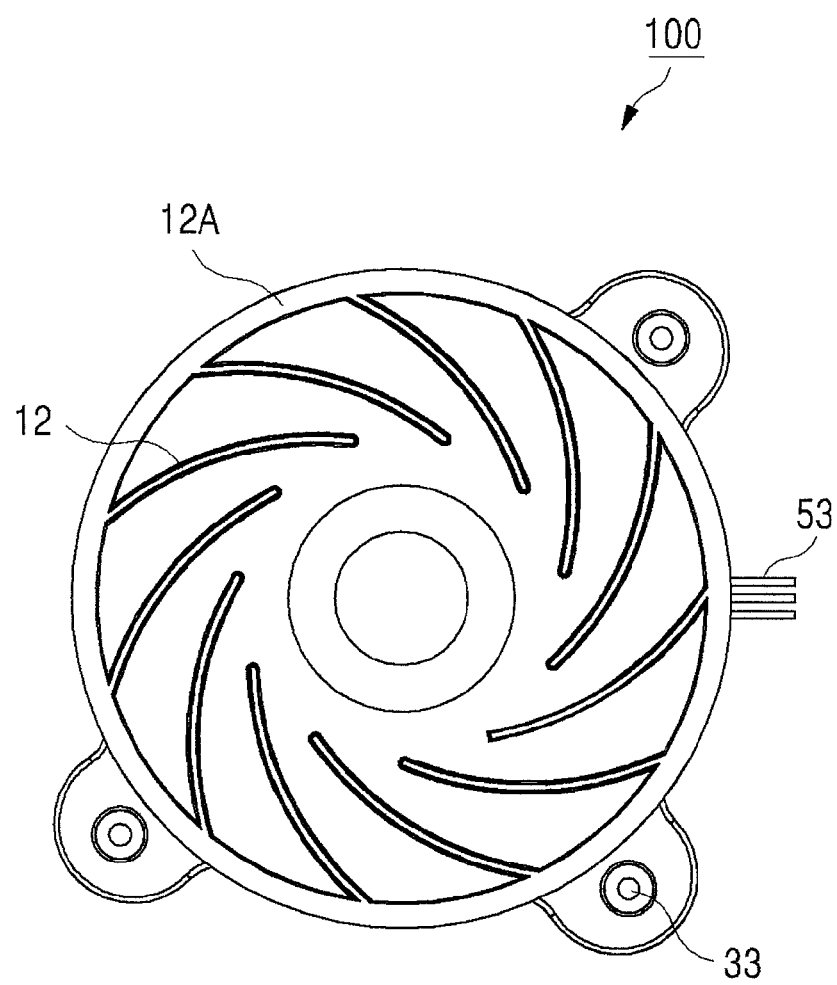

[Fig. 3]
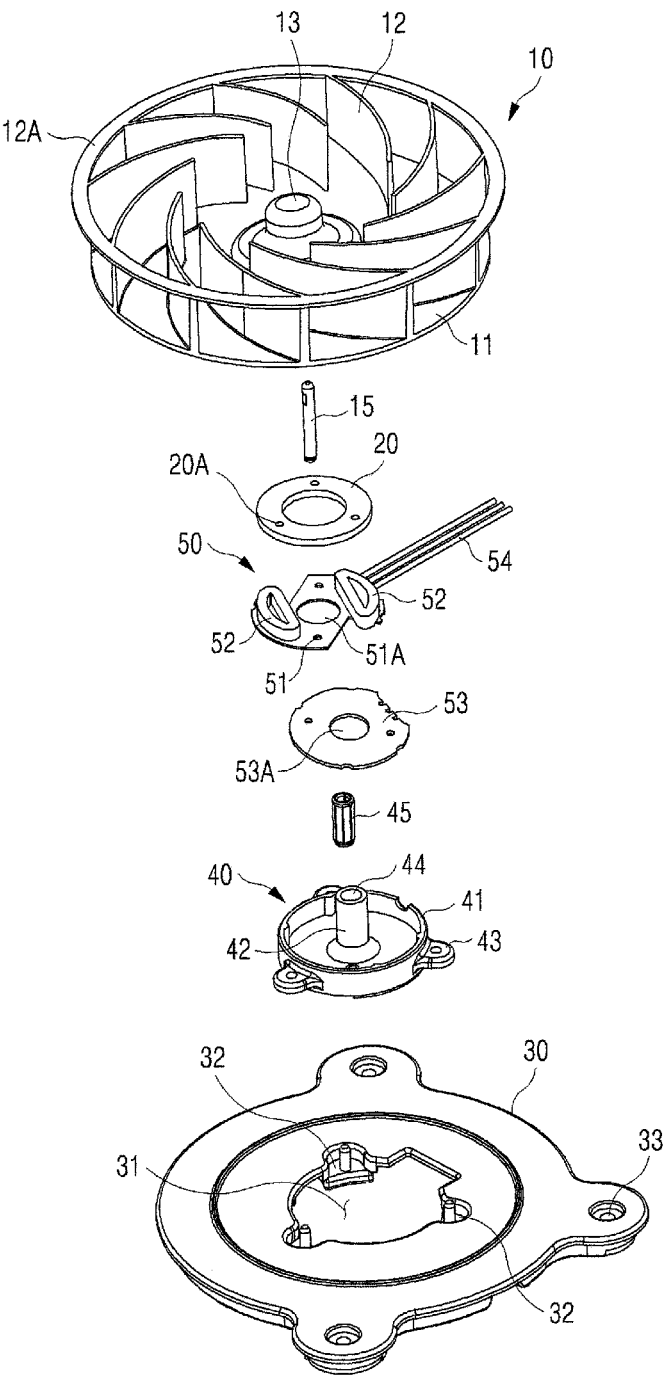

[Fig. 4]
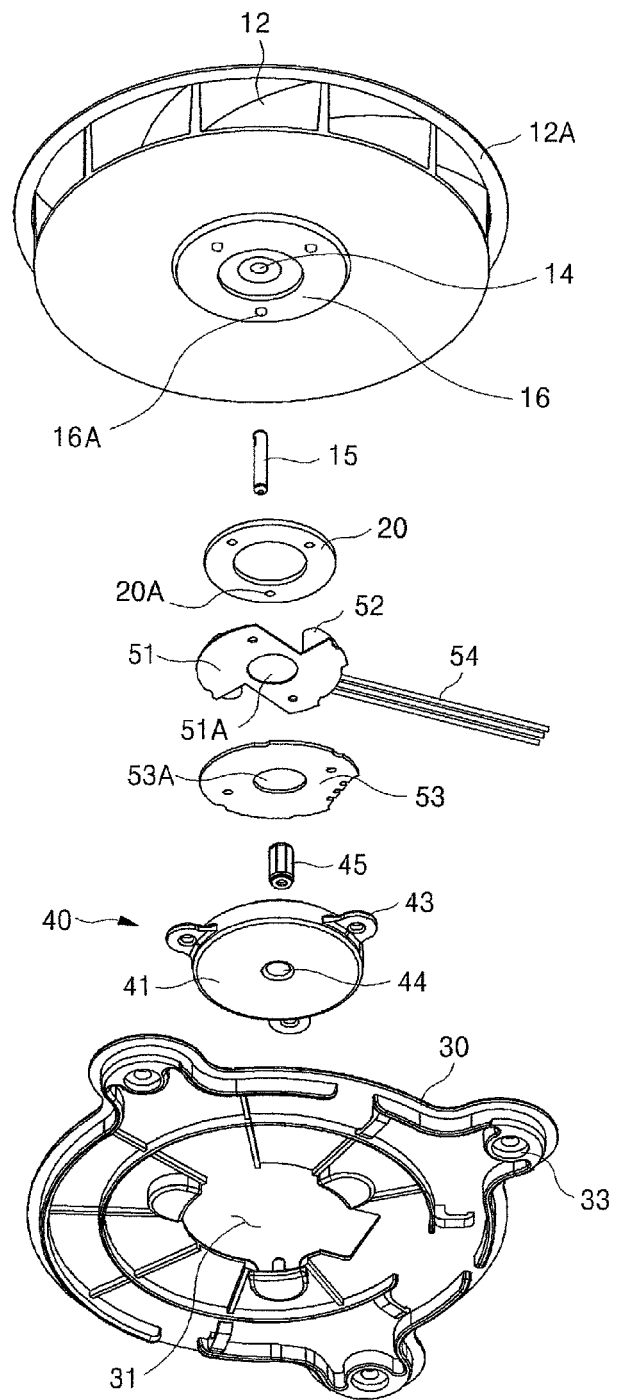

[Fig. 5]
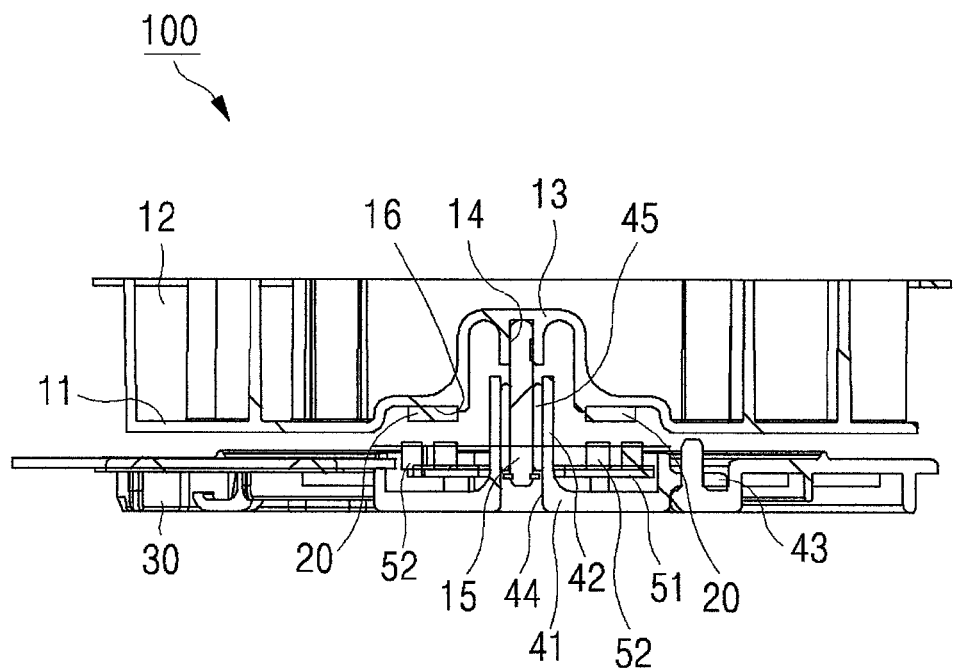

FAN MOTOR

TECHNICAL FIELD

The present invention relates to a fan motor. More specifically, the present invention relates to a fan motor which can streamline the structure and lower manufacturing costs by reducing the number of components of a rotor.

BACKGROUND ART

In general, a fan motor refers to a motor used for air circulation or forced ventilation. A fan motor includes a stator and a rotor, as a typical motor does. Such fan motors are classified into two types of an outer rotor type in which a rotor is located outside a stator to rotate and an inner rotor type in which a rotor is located inside a stator to rotate.

Korean Patent Laid-open No. 10-2010-0039163 discloses an inner rotor type fan motor. According to the inner rotor type fan motor, a stator and a rotor can be placed inside the upper and lower brackets, thereby protecting motor components from moisture permeation from the outside, etc., which is an advantage, but increasing the number of components, which is a disadvantage.

Korean Patent Laid-open No. 10-2018-0010552 discloses an outer rotor type fan motor. The outer rotor type fan motor facilitates the assembly and reduces the number of components, whereas needs to add a process for coupling a yoke with rotor magnets attached to a fan and causes a complex structure.

Korean Patent Laid-open No. 10-2018-0013244 discloses a fan motor configured by including a rotor housing and a ring-shaped magnet coupled to the inner circumferential surface of the rotor housing, in a fan. A stator comprising a stator core around which a coil is wound is located inside the ring-shaped magnet. The stator core is formed by laminating thin steel sheets, which may cause an increase in manufacturing costs.

In order to solve the above-mentioned problems, the present inventor suggests a fan motor having a novel structure in order to integrate a rotor housing with a rotor magnet as one part in an outer rotor type fan motor, and also prevent the inflow of dusts into a space of the motor.

DISCLOSURE OF INVENTION

Technical Problem

It is an object of the present invention to provide a fan motor that does not employ a rotor housing, thereby reducing the number of components.

It is another object of the present invention to provide a fan motor that has simple structure, thereby lowering manufacturing costs.

The objects above and other objects inferred therein can be easily achieved by the present invention explained below.

Solution to Problem

The fan motor according to the present invention comprises a fan 10 comprising a fan body 11 having a circular plate shape, a plurality of fan blades 12 formed in an upper portion of the fan body 11, a central protruding part 13 protruding upwardly from a central portion of the fan body 11, a shaft fixing part 14 formed in an inner side of the central protruding part 13, a shaft 15 coupled and fixed to the shaft fixing part 14 to rotate when the fan body 11 rotates, and a magnet receiving part 16 formed in a central lower portion of the fan body 11; a ring plate magnet 20 coupled to the magnet receiving part 16; a motor bracket 30 having a PCB bracket coupling part 31 formed in a center; a PCB bracket 40 comprising a body 41 having a cup shape, a bearing insertion part 42 having a cylinder shape, protruding upwardly from a center of the body 41, a through-hole 44 formed inside the bearing insertion part 42, into which a bearing 45 is inserted, and the bearing 45 inserted and fixed to the through-hole 44; and a coil-PCB assembly 50 comprising a coil cover 51, a pair of D-type coils 52 installed in the coil cover 51, and a PCB 53 located in a lower portion of the coil cover 51 and installed in the body 41, wherein the ring plate magnet 20 installed in a lower portion of the fan body 11 is located in an upper portion of the pair of D-type coils 52 to face therewith.

In the present invention, an insertion hole 51A and a hole 53A may be formed in a center of the coil cover 51 and PCB 53, respectively, and when the coil cover 51 and PCB 53 are installed in the PCB bracket 40, the bearing insertion part 42 may be inserted into the insertion hole 51A and hole 53A such that the coil cover 51 and PCB 53 are located in a bottom surface inside the body 41.

In the present invention, the through-hole 44 may be penetrated from an upper end of the bearing insertion part 42 to a central lower portion of the body 41 such that a lower end of the shaft 15 is exposed to a central lower portion of the PCB bracket 40.

In the present invention, preferably, at least one coupling groove 32 is formed around the PCB bracket coupling part 31.

In the present invention, preferably, the pair of D-type coils 52 is installed such that a curved portion thereof is located in an outer side.

Advantageous Effects of Invention

The present invention has the effect of providing a fan motor that does not employ a rotor housing, thereby reducing the number of components and has a simple structure, thereby lowering manufacturing costs.

BRIEF DESCRIPTION OF DRAWINGS

FIG. 1 is a perspective view illustrating a fan motor according to the present invention;

FIG. 2 is a plan view illustrating a fan motor according to the present invention;

FIG. 3 is a top exploded perspective view illustrating a fan motor according to the present invention;

FIG. 4 is a bottom exploded perspective view illustrating a fan motor according to the present invention; and FIG. 5 is a cross-sectional view of a fan motor according to the present invention.

Hereinafter, the present invention will be explained in detail with reference to the accompanying drawings.

MODE FOR THE INVENTION

FIG. 1 is a perspective view illustrating a fan motor 100 according to the present invention. FIG. 2 is a plan view thereof. FIG. 3 is a top exploded perspective view illustrating the fan motor 100 according to the present invention. FIG. 4 is a bottom exploded perspective view thereof. FIG. 5 is a cross-sectional view of the fan motor 100 according to the present invention.

Referring to FIG. 1 to FIG. 5 together, the fan motor 100 according to the present invention includes a fan 10, a ring plate magnet 20, a motor bracket 30, a PCB bracket 40, and a coil-PCB assembly 50.

The fan 10 of the present invention includes a fan body 11 having a circular plate shape, a plurality of fan blades 12 formed in an upper portion of the fan body 11, a central protruding part 13 protruding upwardly from a central portion of the fan body 11, a shaft fixing part 14 formed in an inner side of the central protruding part 13, a shaft 15 coupled and fixed to the shaft fixing part 14 to rotate when the fan body 11 rotates, and a magnet receiving part 16 formed in a central lower portion of the fan body 11, to which the ring plate magnet 20 is directly coupled. An outer circumferential portion in the upper end of the fan blade 12 may be connected by a coupling ring 12A. The ring plate magnet 20 is a ring-shaped magnet having a thin plate form. The fan 10 is preferably manufactured by an insert injection molding in the state where the shaft 15 and ring plate magnet 20 are located in a mold. A plurality of fixing holes 20A may be formed in the ring plate magnet 20 at symmetrical positions. A plurality of fixing projections 16A formed in the magnet receiving part 16 by an insert injection molding is coupled to the fixing holes 20A. Thus, the ring plate magnet 20 can be more firmly coupled to the magnet receiving part 16.

The central protruding part 13 has a shape protruding upwardly from a center of the fan body 11, and the shaft fixing part 14 is formed in a space of the central protruding part 13. The upper end of the shaft 15 is fixed and installed in the shaft fixing part 14. The shaft 15 is fixed to the shaft fixing part 14 and at the same time is inserted and installed in the bearing 45.

The motor bracket 30 has a PCB bracket coupling part 31 formed in a center, and at least one coupling groove 32 is formed around the PCB bracket coupling part 31. A PCB bracket 40 is coupled to the PCB bracket coupling part 31. A coupling member 43 of the PCB bracket 40 is placed in the coupling groove 32 so that the PCB bracket 40 can be firmly coupled to the motor bracket 30. At least one fixing part 33 is formed around the motor bracket 30. The fixing part 33 is formed to couple the fan motor 100 to a position to be installed, for example, the body of a refrigerator.

The PCB bracket 40 receives the coil-PCB assembly 50 integrated with a PCB 53. The PCB bracket 40 includes a body 41 having a cup shape, a bearing insertion part 42 having a cylinder shape, protruding upwardly from a center of the body 41, at least one coupling member 43 protruding outwardly from a circumference of the body 41, a through-hole 44 formed inside the bearing insertion part 42, into which a bearing 45 is inserted, and the bearing 45 inserted and fixed to the through-hole 44.

The bearing 45 is installed in the through-hole 44 formed in the bearing insertion part 42, and the bearing 45 serves as a support so that the shaft 15 is rotatable. The through-hole 44 is penetrated from an upper end of the bearing insertion part 42 to a central lower portion of the body 41. That is, a lower end of the shaft 15 is exposed to a central lower portion of the PCB bracket 40. Thus, an advantageous structure is provided which supplies oil to the bearing 45 or eliminates dusts therefrom, etc., through the through-hole 44.

The coil-PCB assembly 50 of the present invention is integrated with a PCB, and has a simple structure in which no stator core is included. The coil-PCB assembly 50 includes a coil cover 51, a pair of D-type coils 52 installed in the coil cover 51, a PCB 53 located in a lower portion of the coil cover 51 and installed in the body 41, and a lead wire 54 drawn out to the outside from the PCB 53 to supply power. An insertion hole 51A is formed in a center of the coil cover 51, and a hole 53A is formed in a center of the PCB 53 corresponding thereto. Thus, when the coil cover 51 is located in a upper portion of the PCB 53 to be installed in the PCB bracket 40, the bearing insertion part 42 is inserted into the insertion hole 51A and the hole 53A of the PCB 53 such that the PCB 53 is placed in a bottom surface inside the body 41.

The D-type coil 52 is installed in the coil cover 51, which is a magnetic substance. A pair of D-type coils 52 is installed in the coil cover 51. The D-type coil 52 has a plane shape of alphabet "D," and is installed such that a curved portion thereof is located in an outer side. Also, the ring plate magnet 20 installed in a lower portion of the fan body 11 is located in an upper portion of the pair of D-type coils 52 to face therewith. Thus, when power is supplied to the lead wire 54, a changing magnetic field is formed around the D-type coil 52, and the magnetic field interacts with the ring plate magnet 20 to rotate the fan 10.

The detailed description of the present invention described as above simply explains examples for understanding the present invention, but does not intend to limit the scope of the present invention. The scope of the present invention is defined by the accompanying claims. Additionally, it should be construed that simple modifications or changes of the present invention fall within the scope of the present invention.

The invention claimed is:

1. A fan motor comprising:
    a fan 10 comprising a fan body 11 having a circular plate shape, a plurality of fan blades 12 formed in an upper portion of the fan body 11, a central protruding part 13 protruding upwardly from a central portion of the fan body 11, a shaft fixing part 14 formed in an inner side of the central protruding part 13, a shaft 15 coupled and fixed to the shaft fixing part 14 to rotate when the fan body 11 rotates, and a magnet receiving part 16 formed in a central lower portion of the fan body 11;
    a ring plate magnet 20 coupled to the magnet receiving part 16;
    a motor bracket 30 having a PCB bracket coupling part 31 formed in a center;
    a PCB bracket 40 comprising a body 41 having a cup shape, a bearing insertion part 42 having a cylinder shape, protruding upwardly from a center of the body 41, a through-hole 44 formed inside the bearing insertion part 42, into which a bearing 45 is inserted, and the bearing 45 inserted and fixed to the through-hole 44; and
    a coil-PCB assembly 50 comprising a coil cover 51, a pair of D-type coils 52 installed in the coil cover 51, and a PCB 53 located in a lower portion of the coil cover 51 and installed in the body 41,
    wherein the ring plate magnet 20 installed in a lower portion of the fan body 11 is located in an upper portion of the pair of D-type coils 52 to face therewith,
    wherein the fan 10 is formed by an insert injection molding with the shaft 15 and the ring plate magnet 20 located in a mold, whereby the ring plate magnet 20 is directly coupled to the magnet receiving part 16,
    wherein a plurality of fixing holes 20A are formed in the ring plate magnet 20,
    wherein a plurality of fixing projections 16A formed in the magnet receiving part 16 is coupled to the plurality of fixing holes 20A.

2. The fan motor of claim 1, wherein an insertion hole 51A and a hole 53A are formed in a center of the coil cover 51 and PCB 53, respectively, and when the coil cover 51 and PCB 53 are installed in the PCB bracket 40, the bearing insertion part 42 is inserted into the insertion hole 51A and hole 53A such that the coil cover 51 and PCB 53 are located in a bottom surface inside the body 41.

3. The fan motor of claim 1, wherein the through-hole 44 is penetrated from an upper end of the bearing insertion part 42 to a central lower portion of the body 41 such that a lower end of the shaft 15 is exposed to a central lower portion of the PCB bracket 40.

4. The fan motor of claim 1, wherein at least one coupling groove 32 is formed around the PCB bracket coupling part 31.

5. The fan motor of claim 1, wherein the pair of D-type coils 52 is installed such that a curved portion thereof is located in an outer side.

\* \* \* \* \*